Figures 1, 2:
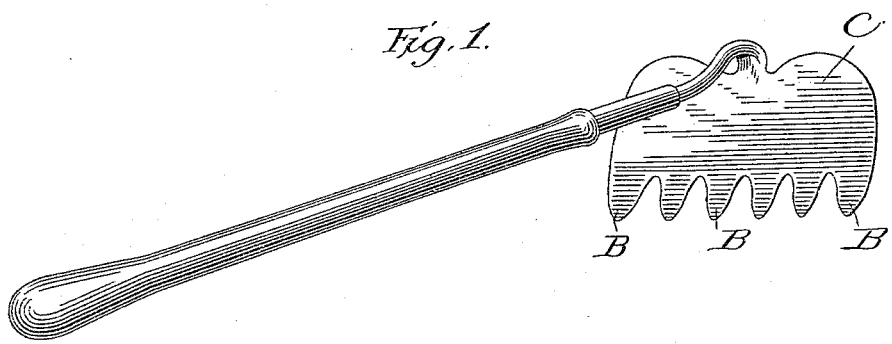

(No Model.)

E. K. BOOTHBY.
FIELD OR FARM HOE.

No. 319,183. Patented June 2, 1885.

Attest:
Walter Donaldson
F. L. Middleton

Inventor
Edward K. Boothby
by Joyce & Spear
Attys.

UNITED STATES PATENT OFFICE.

EDWARD K. BOOTHBY, OF PORTLAND, MAINE.

FIELD OR FARM HOE.

SPECIFICATION forming part of Letters Patent No. 319,183, dated June 2, 1885.

Application filed November 2, 1882. (No model.)

*To all whom it may concern:*

Be it known that I, EDWARD K. BOOTHBY, a citizen of the United States, residing at Portland, in the county of Cumberland and State of Maine, have invented a certain new and useful Improvement in Field or Farm Hoes, of which the following is a specification.

My invention is a combined hoe and rake, and is designed for the purposes of either of these implements, the object being to so construct the combination implement that it may be used for one purpose or the other with an effect equal if not superior to the ordinary implements ordinarily used for hoeing or raking. The combination of the two implements in one as arranged in my invention obviates the difficulties heretofore existing in similar combination implements.

This implement is designed as an improvement upon that class of hoes which are provided with teeth on their lower face, and with the parts of the implement secured to each other by bolts or rivets, as these hoes have been found objectionable because of their liability to break in hard ground, and to choke up and become useless when used for the double purpose of a rake and hoe.

To this end my invention consists in making the hoe of one piece of cast-steel, with teeth on its lower edge about one-third of the height or depth of the blade, the said teeth being formed in a sinuous curve, whereby the weeds, &c., cannot choke in the space thus formed between the teeth and interfere with the cutting-edges, as has been the case heretofore.

In the drawings, Figure 1 is a view in perspective of the hoe as improved by me. Fig. 2 is a rear view of the blade of the same.

Great difficulty has been experienced in the use of these combination implements prior to my invention on account of various reasons. First of all, they were usually made with the blade riveted to the shank or socket, and as more strain and work are put upon this class of implements than upon one adapted for a single purpose, in a little while the rivets would become weakened by the severe strain and the hoe rendered incapable of further work until repairs were made. Another objection to this class of hoes arises because of the shape and thinness of the teeth on the edge. In most cases they are made of thin metal and tapering to a point at the end, and consequently in stony or very hard ground these points will become broken and nicked, so as to render in a very short time this part of the hoe useless. This arrangement of the teeth also provides a very narrow opening between the teeth at the base, into which the weeds are liable to become forced, and in this way the passages are choked up and the cutting action of the hoe interfered with. To overcome these existing difficulties, it is necessary, first, to have the hoe formed in one piece of preferably cast-steel, so as to give the greatest possible amount of strength without having a single part of weaker strength than the rest; secondly, the teeth must be of such size and shape that they will not take up enough of the hoe-surface to interfere with the operation of the implement as a hoe; further, that they will not clog up with weeds, &c., to prevent the cutting action of the teeth and their penetration of the ground, and, further, so that no points will be presented liable to become broken by contact with hard or stony ground. With these points in view I form the blade, socket, and teeth of the hoe of solid cast-steel in one piece. The teeth B B are formed in a sinuous curve, and are about one-third of the depth of the hoe-blade. The lower part of the teeth is sharper than a circle, so as to enter the ground easily, and still not so slender as to be broken. These teeth increase in width in a curve, as shown, to the base, and are separated from each other by a small rounded space, thus forming a continuous sinuous curve which is sharp for its whole extent, which renders choking by weeds, &c., impossible.

Six teeth are shown in the drawings; but it will be understood that any number may be used. The teeth are sharpened upon the edges and the spaces between the teeth, as shown at *a*.

I am aware that it is not new to provide implements with rake-teeth upon one side and a hoe-blade upon the opposite side with a handle secured to the implement in the center between the two, as such a construction is shown in the patent of Ames, No. 43,869, and this I do not claim, as this arrangement of the parts would entirely defeat the object aimed at by me.

I am also aware that hoes with plain body and toothed edges formed by V-shaped cuts or angles have been heretofore known, the same being shown in the patent of Springstead, November 9, 1869; Walker, December 11, 1877, and in that of Ritson and Brigg, June 5, 1866. My hoe differs from these in having the sinuous curve shown, and no angles in which fibrous matters could lodge.

Having thus described my invention, what I claim is—

As a new article of manufacture, a hoe made in one piece, with a plain body portion, and a toothed portion, B, formed on a sinuous curve with a continuous cutting-edge, the teeth being in length about one-third of the depth of the blade, all substantially as shown and described.

EDWARD K. BOOTHBY.

Witnesses:
J. TIERNEY,
D. E. AYER.